United States Patent
Lindsay-Neale

(10) Patent No.: US 11,292,399 B2
(45) Date of Patent: Apr. 5, 2022

(54) CARRIER ARRANGEMENT FOR A SENSOR HOUSING INCLUDING A CLIP ELEMENT AND A COUNTER-BEARING

(71) Applicant: PMA/TOOLS AG, Willich (DE)

(72) Inventor: Robert Lindsay-Neale, Duesseldorf (DE)

(73) Assignee: PMA/TOOLS AG, Willich (DE)

( * ) Notice: Subject to any disclaimer, the term of this patent is extended or adjusted under 35 U.S.C. 154(b) by 0 days.

(21) Appl. No.: 17/434,420

(22) PCT Filed: Jun. 25, 2020

(86) PCT No.: PCT/DE2020/100553
§ 371 (c)(1),
(2) Date: Aug. 27, 2021

(87) PCT Pub. No.: WO2021/013291
PCT Pub. Date: Jan. 28, 2021

(65) Prior Publication Data
US 2022/0041118 A1    Feb. 10, 2022

(30) Foreign Application Priority Data

Jul. 24, 2019    (LU) .................................... 101336

(51) Int. Cl.
*B60R 11/04* (2006.01)
*B60R 11/00* (2006.01)
*G03B 17/56* (2021.01)

(52) U.S. Cl.
CPC ............ *B60R 11/04* (2013.01); *G03B 17/561* (2013.01); *B60R 2011/0026* (2013.01); *B60R 2011/0071* (2013.01)

(58) Field of Classification Search
CPC combination set(s) only.
See application file for complete search history.

(56) References Cited

U.S. PATENT DOCUMENTS

| 10,086,773 B2 | 10/2018 | Okuda |
| 2015/0015713 A1 | 1/2015 | Wang et al. |
| 2021/0031704 A1 | 2/2021 | Lamoureux |

FOREIGN PATENT DOCUMENTS

| DE | 102013005801 A1 | 10/2014 |
| DE | 112013001547 T5 | 2/2015 |

(Continued)

*Primary Examiner* — Minh Q Phan
(74) *Attorney, Agent, or Firm* — Leydig, Voit & Mayer, Ltd.

(57) ABSTRACT

A carrier device includes a base plate fixedly attachable to a window pane and a carrying arrangement, for holding a housing of a sensor device, that includes a clip element configured for retaining a rod-shaped component disposed at an end of the housing. The clip element is formed by two legs extending from the base plate. The ends of the legs remote from the base plate define an entry region for the rod-shaped component that is adjoined, in a direction toward the base plate, by a receiving space which is laterally bounded by concavely shaped receiving contours formed in the two legs in this region. The base plate has a counter-bearing disposed thereon which has a concavely shaped support region for supporting the rod-shaped component. The counter-bearing is located on a side of the clip element adjacent the housing when the sensor device is in a mounted position.

12 Claims, 4 Drawing Sheets

(56) References Cited

FOREIGN PATENT DOCUMENTS

| EP | 3258119 A1 | 12/2017 | | |
|---|---|---|---|---|
| FR | 3074103 A1 | 5/2019 | | |
| WO | WO-2018055905 A1 | * | 3/2018 | ............. G03B 19/07 |

* cited by examiner

CARRIER ARRANGEMENT FOR A SENSOR HOUSING INCLUDING A CLIP ELEMENT AND A COUNTER-BEARING

CROSS-REFERENCE TO PRIOR APPLICATIONS

This application is a U.S. National Phase application under 35 U.S.C. § 371 of International Application No. PCT/DE2020/100553, filed on Jun. 25, 2020, and claims benefit to Luxembourg Patent Application No. LU101336, filed on Jul. 24, 2019. The International Application was published in German on Jan. 28, 2021 as WO 2021/013291 A1 under PCT Article 21(2).

FIELD

The invention is in the field of mounts for motor vehicle accessories and relates to mounts for attachment to the inner surface of a vehicle window pane for holding sensor devices, in particular cameras, as well as to an assembly including a mount for a sensor device and a vehicle window pane.

BACKGROUND

Mounts or carrier devices are used to attach components of driver assistance systems to a window pane, e.g., a windshield, of a motor vehicle. These mounts are, for example, adhesively bonded to the inner surface of the windshield. Subsequently, a sensor is attached to this mount. The sensor is, for example, a camera, which may be part of a driver assistance system. Typically, a suitably adapted cover, also referred to as "beauty cover", is mounted thereon.

The sensor may be a camera having a housing which has laterally extending projections, in particular rod-shaped projections. The housing may further be provided with protrusions or the like which may engage with a hook-shaped holder of the carrier device, as disclosed, for example, in DE 11 2013 001 547 T5 and US 2015/0015713 A1. Thus, such a generally rectangular sensor housing has two rod-shaped projections at one end, which are attached opposite each other to the housing, each to a respective side thereof. In addition, the housing is provided at the other end with protrusions which may engage with corresponding hook-shaped holders.

Such a system is disclosed, for example, in European Patent Publication EP 3 258 119 A1. Here, the rod-shaped projections of the camera housing are held and retained in a metal spring clip which is slid onto a suitably shaped portion of the mount. In addition, the other end of the housing is here provided with legs which engage with corresponding hook-shaped holders. One disadvantage here is the multi-piece design with a metal spring clip and a holding device provided in the mount for this spring clip. For example, in the manufacture of this mount, each spring clip must be separately produced, handled, and finally mounted on the respective holding device. Another disadvantage may arise from the metal itself, which may corrode or may be expensive.

German Patent Publication DE 10 2013 005 801 A1 discloses a mount for cameras which is for attachment to a windshield and uses clip elements. Here, the rod-shaped projections are inserted into a clip element and additionally secured in place by a retaining hook. The system disclosed therein is not provided with protrusions or hook-shaped holders. The advantage here is the possibility of an integral formation of the clip elements. However, it is a disadvantage that, due to the shape of the clip elements, a larger gap remains between the legs of the clip element, which necessitates an additional retaining hook for reliably retaining the rod-shaped projections. Another disadvantage is that the distance between the clip element and the camera housing is limited by the requirement to prevent excessive bending forces from acting on the rod-shaped projection, which could result in breakage of the projection.

French Patent Application FR 3 074 103 A1 also shows a carrier arrangement for cameras which is for attachment to a windshield. Here, the means for attaching the camera are integrally formed with the base plate of the carrier arrangement.

SUMMARY

In an embodiment, the present invention provides a carrier device for attachment to a window pane of a motor vehicle. The carrier device includes a base plate fixedly attachable to the window pane and a carrying arrangement configured for holding at least a housing of a sensor device, in particular of a camera. The carrying arrangement includes at least one clip element configured for retaining a rod-shaped component disposed at a first end of the housing of the sensor device. The clip element is formed by two legs extending from the base plate. The ends of the legs remote from the base plate define an entry region for the rod-shaped component. The entry region is adjoined, in a direction toward the base plate, by a receiving space which is laterally bounded by concavely shaped receiving contours formed in the two legs in this region. The base plate has at least one counter-bearing disposed thereon which has an, in particular concavely shaped, support region for supporting the rod-shaped component. The at least one counter-bearing is located on a side of the clip element adjacent the housing when the sensor device is in a mounted position.

DETAILED DESCRIPTION

Figure 1:
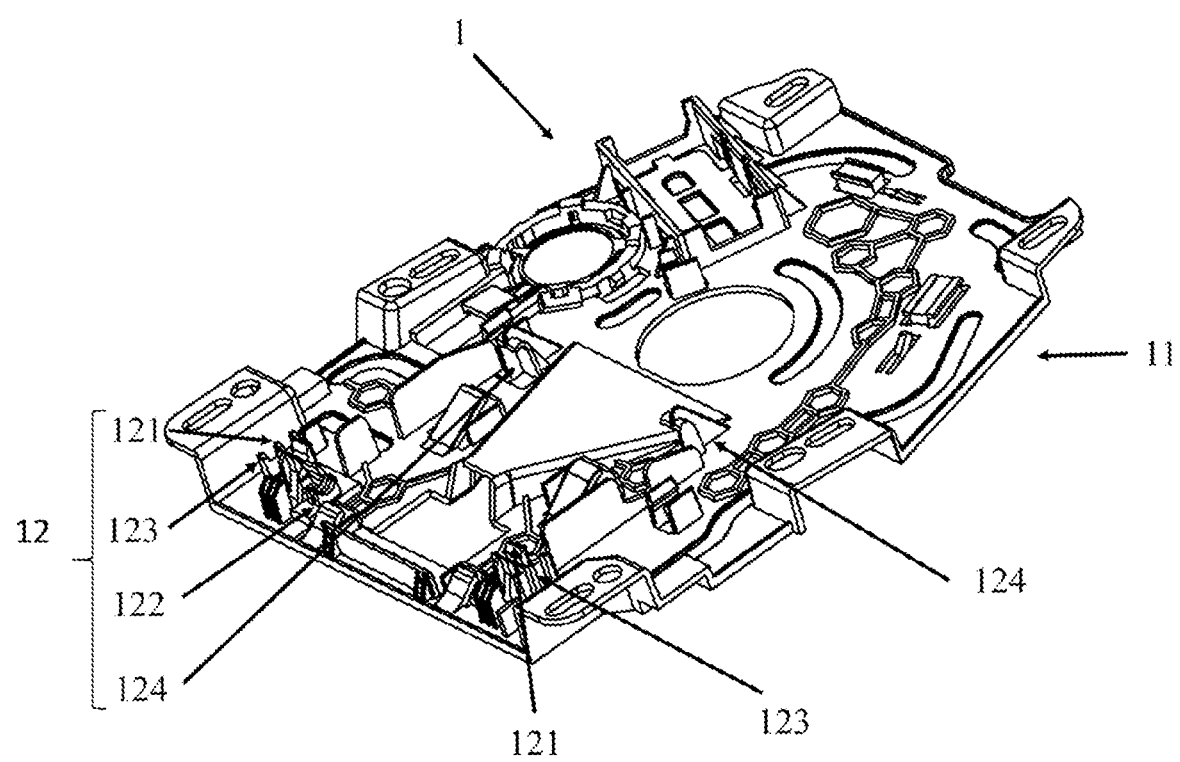
FIG. 1 shows a carrier device according to an embodiment of the present invention.

Embodiments of the present invention provide a mount for a housing of a sensor device, which mount is adapted for attachment to a windshield, is inexpensive to manufacture, and allows for secure and permanent retention while, at the same time, providing for simplified mounting of the sensor device.

A carrier device according to embodiments of the invention is used for attachment of a sensor, which may be part of a driver assistance system, to a window pane of a motor vehicle. The carrier device includes a base plate which is fixedly attachable to an inner surface of a vehicle window pane, for example by adhesive bonding, and a carrying arrangement for holding at least a housing of a sensor device. This carrying arrangement includes at least one clip element configured for retaining a rod-shaped component disposed at a first end of a housing of a sensor device and projecting from the housing. The sensor device may be, for example, a camera. In this respect, the terms "sensor," "sensor device," and "camera" are used interchangeably.

The clip element according to an embodiment of the invention includes two legs which extend from the base plate and may be connected thereto preferably by a material-to-material bond. The ends of the legs remote from the base plate define an entry region for the rod-shaped component of the sensor housing. In a direction toward the base plate, the entry region is adjoined by a receiving space of the clip element, into which the rod-shaped component enters after passing through the entry region during mounting. In a preferred embodiment, the legs themselves are inclined toward each other and are optionally additionally formed in their upper thirds with entry bevels for the rod-shaped component of the sensor housing.

The receiving space is laterally bounded by the legs, which are formed with concave receiving contours in this region. "Lateral" is here defined as transverse to an axial direction of extension of the rod-shaped component of a mounted sensor device and, at the same time, transverse to a normal to the base plate of the carrier device. Furthermore, as previously described, the legs may be inclined toward each other in this region.

The carrier device according to an embodiment of the invention further includes a counter-bearing, disposed on the base plate, for the rod-shaped component of the housing. The counter-bearing is connected to the base plate in particular by a material-to-material bond, and is located on the side of the clip element adjacent the housing when the sensor device is in the mounted position. The counter-bearing may also be composed of a plurality (for example, two) of counter-bearing elements. The counter-bearing elements are connected to the base plate substantially independently of each other and each optionally integrally therewith. When the sensor device is in a mounted position, the counter-bearing, or at least one of the counter-bearing elements, may be located completely between the housing and the side of the clip element adjacent the housing. At its end facing away from the base plate, the counter-bearing has an, in particular concavely shaped, support region for supporting the rod-shaped component.

The support region of the counter-bearing is ideally located approximately at the level of the lower end of the receiving space of the clip element, as viewed in a direction perpendicular to base plate. The counter-bearing serves to support the rod-shaped component of the housing, and can thus prevent bending or breakage of this component.

In a preferred embodiment, the carrying arrangement also includes a positioning device for the rod-shaped component. The positioning device is connected to the base plate in particular by a material-to-material bond, and is located on the side of the clip element opposite the counter-bearing. The positioning device may interact with the free end of the rod-shaped component of the housing. In addition, due to an inclined guide surface located in the upper third, it may serve for accurate insertion of the rod-shaped component into the clip element, and thus for accurate insertion of the sensor device housing into the carrying arrangement. It may also serve for additional retention of the rod-shaped component in order to prevent relative movement between the clip element and the rod-shaped component in the axial direction of extension of the rod-shaped component. Overall, therefore, the positioning device, in conjunction with the clip element and the counter-bearing, permits accurate mounting and retention of the camera.

The carrying arrangement of the carrier device according to an embodiment of the invention may further have at least one protrusion holder. This protrusion holder is configured to be capable of engaging in a hook-like manner behind a protrusion disposed at a second end of the sensor device housing opposite the first end of the housing. To this end, for example, the hook-shaped portion of the protrusion holder may embrace a portion of the protrusion and/or engage in a corresponding recess of the protrusion. The protrusion holder is connected to the base plate preferably by a material-to-material bond.

Furthermore, the base plate of the carrier device according to an embodiment of the invention may be integrally formed in one piece with the clip element and optionally with the counter-bearing and optionally with at least one positioning device and/or with at least one protrusion holder.

In addition, a carrying arrangement of a carrier device according to an embodiment of the invention may have two or more clip elements via which the housing, or at least the first end of the housing, is fixedly attached to the carrying arrangement. Each of the clip elements may have a counter-bearing and optionally a positioning device associated therewith. These serve to receive the respective rod-shaped component extending from the wall of the housing.

Correspondingly, the carrying arrangement may also include two or more protrusion holders, which are arranged such that they can each engage behind, embrace, or engage in a portion of a protrusion disposed on the sensor housing, at least at the second end thereof.

The aforedescribed inventive carrier device may be fixedly attached to the window pane, preferably the windshield, of a motor vehicle, for example by adhesively bonding it thereto. Accordingly, an assembly including a vehicle window pane, preferably a windshield, and an inventive carrier device is also within the scope of embodiments of the invention.

Further features and advantages of embodiments of the present invention will be apparent from the following description and graphical representation of preferred, but non-limiting exemplary embodiments.

FIG. 1 shows an inventive carrier device (1) for attachment to a window pane of a motor vehicle. The carrier device (1) includes a base plate (11) and a carrying arrangement (12) for a sensor housing (2), the carrying arrangement (12) here being formed by clip elements (121), counter-bearings (122), positioning devices (123), and protrusion holders (124). Counter-bearing (122) includes independent counter-bearing elements and is completely located on the side of the clip element adjacent the housing to be mounted.

Figure 2:
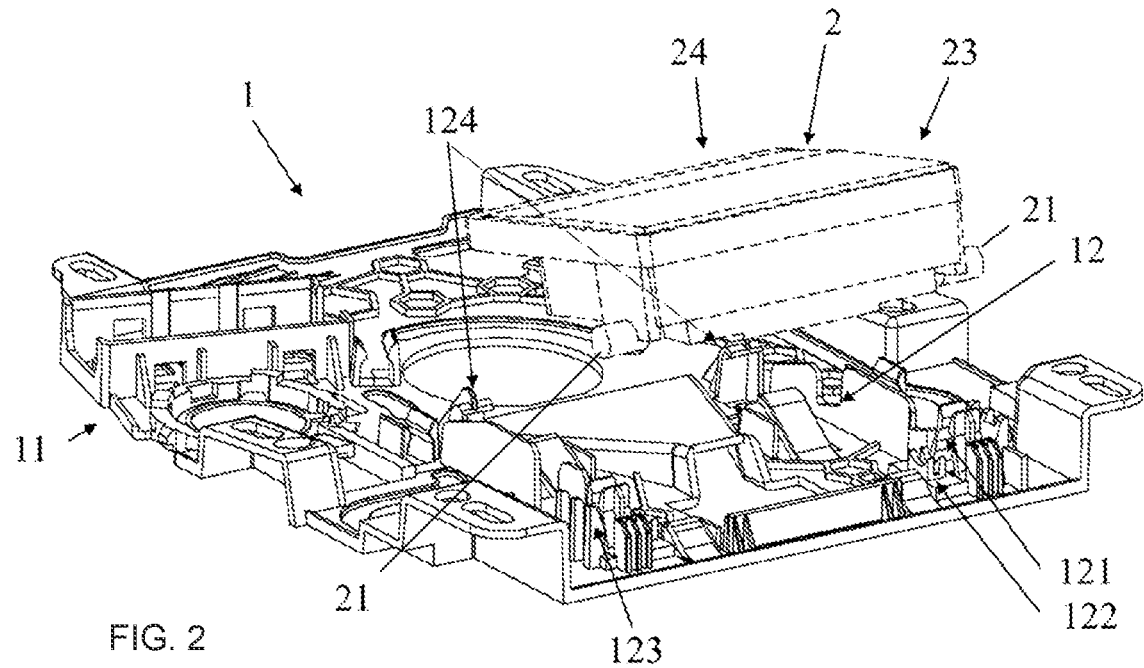
FIG. 2 shows the carrier device of FIG. 1 and, in dashed lines, a sensor housing prior to mounting thereof.

FIG. 2 shows an inventive carrier device (1) and, in dashed lines, a sensor housing (2) prior to mounting thereof. The features of carrier device (1) correspond to those in FIG. 1. Clearly discernible here are the two rod-shaped components (21) disposed at a first end (23) of housing (2). The protrusions (22) disposed at a second end (24) of the housing opposite the first end are not visible in this view.

Figure 3:
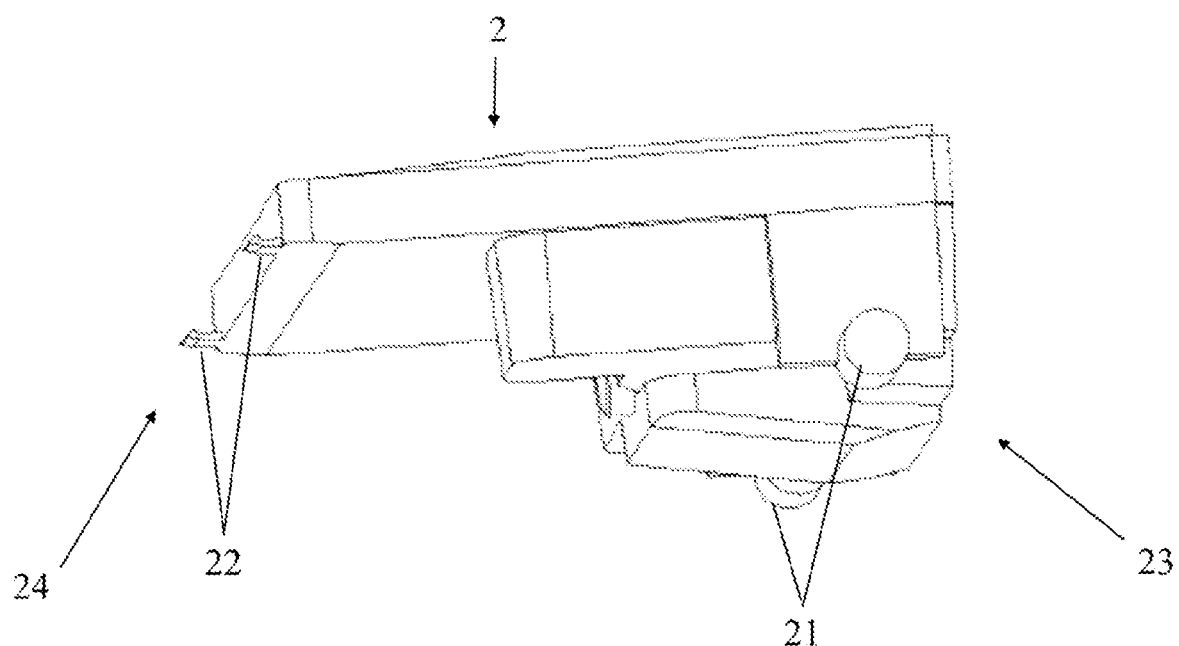
FIG. 3 shows a sensor housing in a perspective side view.

FIG. 3 shows an exemplary sensor housing (2) in a perspective side view. Housing (2) has two rod-shaped components (21) disposed at first end (23) of housing (2). Furthermore, two protrusions (22) are disposed at second end (24) of housing (2).

Figure 4:
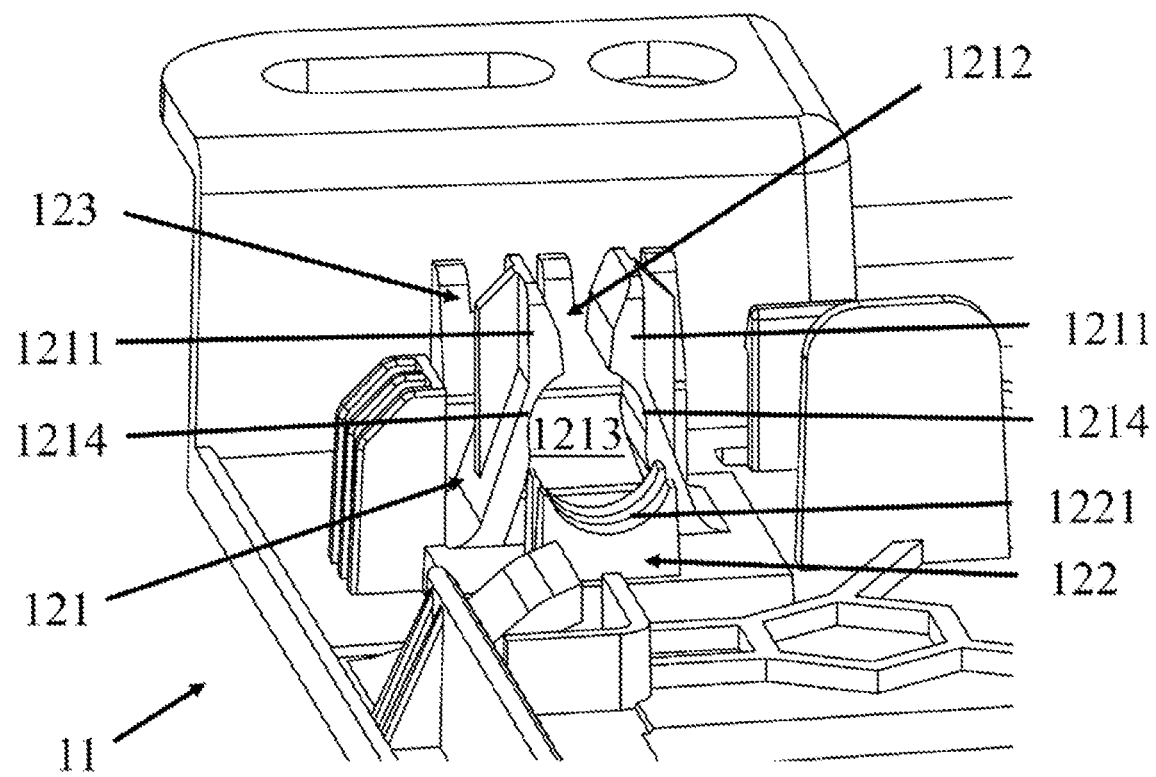
FIG. 4 shows an enlarged view of the clip element and the counter-bearing of the carrier device of FIG. 1.

FIG. 4 shows an inventive clip element (121) and a counter-bearing (122). The two legs (1211) of clip element (121) extend from base plate (11) at an angle relative to each other. The entry region (1212) for rod-shaped component (21) is defined by the ends of the two legs (1211). In a direction toward base plate (11), entry region (1212) is adjoined by the receiving space (1213) for rod-shaped component (21), the receiving space (1213) being bounded by concavely shaped receiving contours (1214) of the two legs (1211). In FIG. 4, a counter-bearing (122) is disposed in front of clip element (121) in the viewing direction. Counter-bearing (122) includes two independent counter-bearing elements. It has a preferably concave support region (1221) capable of supporting an engagement portion of rod-shaped component (21) and, when the sensor housing is in the mounted position, it is completely located on the side of clip element (121) adjacent the sensor housing. A positioning device (123) is disposed in the viewing direction behind clip element (121); i.e., on the side of clip element (121) opposite the counter-bearing (122).

Figure 5:
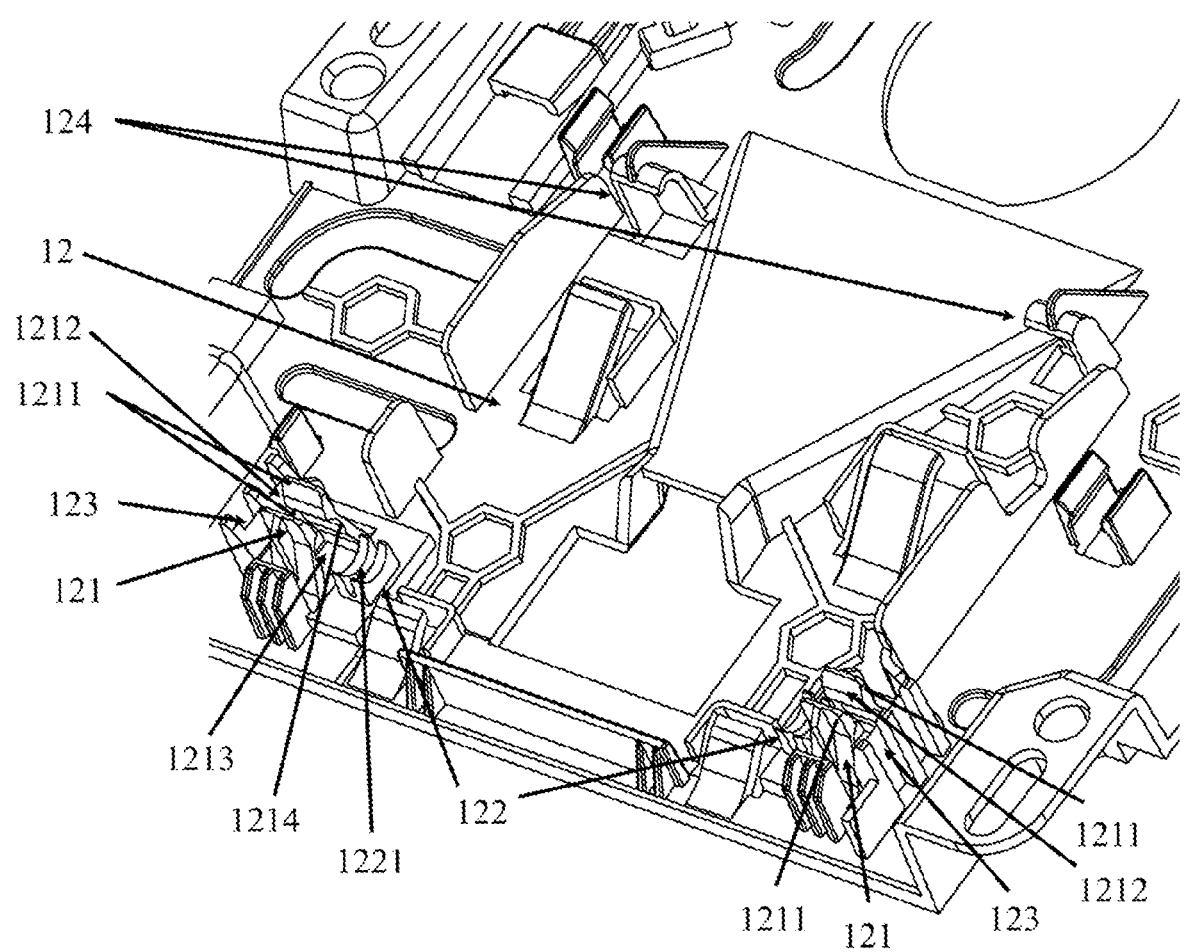
FIG. 5 shows an enlarged view of the carrying arrangement of the carrier device of FIG. 1.

FIG. 5 shows, in enlarged view, the portion of carrier device (1) that forms the carrying arrangement (12) for holding sensor housing (2). As already described with reference to FIGS. 1 and 4, two clip elements (121) are provided here, each having a counter-bearing (122) and a positioning device (123) associated therewith. Counter-bearing (122) is completely located on the side of the clip element adjacent the housing to be mounted and includes two independent counter-bearing elements. Also provided are two protrusion holders (124) capable of engaging in a hook-like manner behind the protrusions (22) at second end (24) of sensor housing (2), as illustrated in FIG. 3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

In the figures, the following reference numerals are used:
1 carrier device
11 base plate
12 carrying arrangement
121 clip element
1211 leg
1212 entry region
1213 receiving space
1214 concavely shaped receiving contour
122 counter-bearing
1221 concave support region
123 positioning device
124 protrusion holder
2 sensor housing
21 rod-shaped component
22 protrusion
23 first end of the sensor housing
24 second end of the sensor housing

The invention claimed is:

1. A carrier device for attachment to a window pane of a motor vehicle, the carrier device comprising:
   a base plate fixedly attachable to the window; and
   a carrying arrangement configured for holding at least a housing of a sensor device, in particular of a camera, and including at least one clip element configured for retaining a rod-shaped component disposed at a first end of the housing of the sensor device,
   wherein the clip element is formed by two legs extending from the base plate, the ends of the legs remote from the base plate defining an entry region for the rod-shaped component, the entry region being adjoined, in a direction toward the base plate, by a receiving space which is laterally bounded by concavely shaped receiving contours formed in the two legs in this region, and
   wherein the base plate has at least one counter-bearing disposed thereon which has an, in particular concavely shaped, support region for supporting the rod-shaped component, and wherein the at least one counter-bearing is located on a side of the clip element adjacent the housing when the sensor device is in a mounted position.

2. The carrier device according to claim 1, wherein the at least one counter-bearing is located completely between the housing and the side of the clip element adjacent the housing when the sensor device is in the mounted position.

3. The carrier device according to claim 1, wherein the at least one counter-bearing includes at least two counter-bearing elements.

4. The carrier device according to claim 3, wherein at least one of the at least two counter-bearing elements is located completely between the housing and the side of the clip element adjacent the housing when the sensor device is in the mounted position.

5. The carrier device according to claim 1, wherein the two legs of the at least one clip element extend from the base plate at an angle relative to each other, the ends remote from the base plate having entry bevels defining the entry region.

6. The carrier device according to claim 1, wherein the carrying arrangement additionally comprises a positioning device disposed on a side of the clip element opposite the counter-bearing and capable of interacting with a free end of the rod-shaped component.

7. The carrier device according to claim 1, wherein the carrying arrangement additionally comprises at least one protrusion holder which extends from the base plate and is configured to engage in a hook-like manner behind a protrusion disposed at a second end of the housing opposite the first end.

8. The carrier device according to claim 1, wherein the base plate and the at least one clip element are integrally formed in one piece.

9. The carrier device according to claim 1, wherein the base plate and the at least one counter-bearing are integrally formed in one piece.

10. The carrier device according to claim 6, wherein the base plate and the positioning device are integrally formed in one piece.

11. The carrier device according to claim 7, wherein the base plate and the at least one protrusion holder are integrally formed in one piece.

12. An assembly comprising a vehicle window and the carrier device according to claim 1.

* * * * *